A. F. CLARK.
ELECTROMECHANICAL PROPELLING AND TRANSMITTING MECHANISM.
APPLICATION FILED MAR. 27, 1917.
1,347,250.
Patented July 20, 1920.
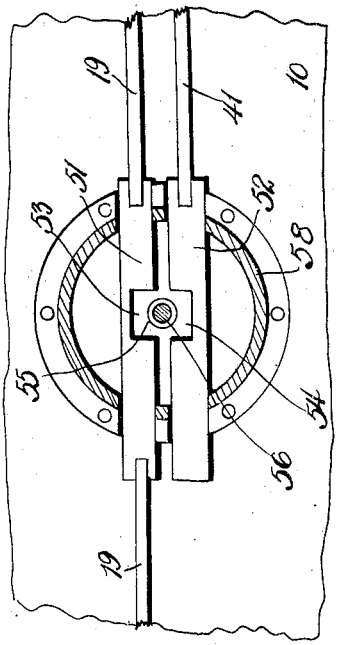
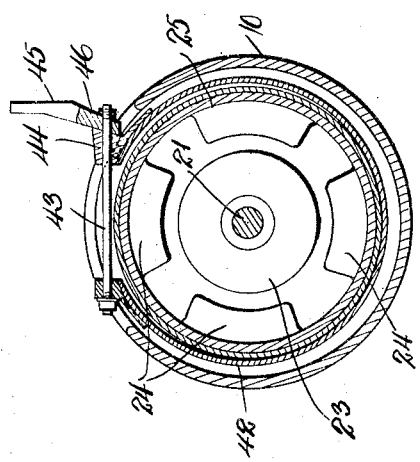
Inventor
A.F.Clark

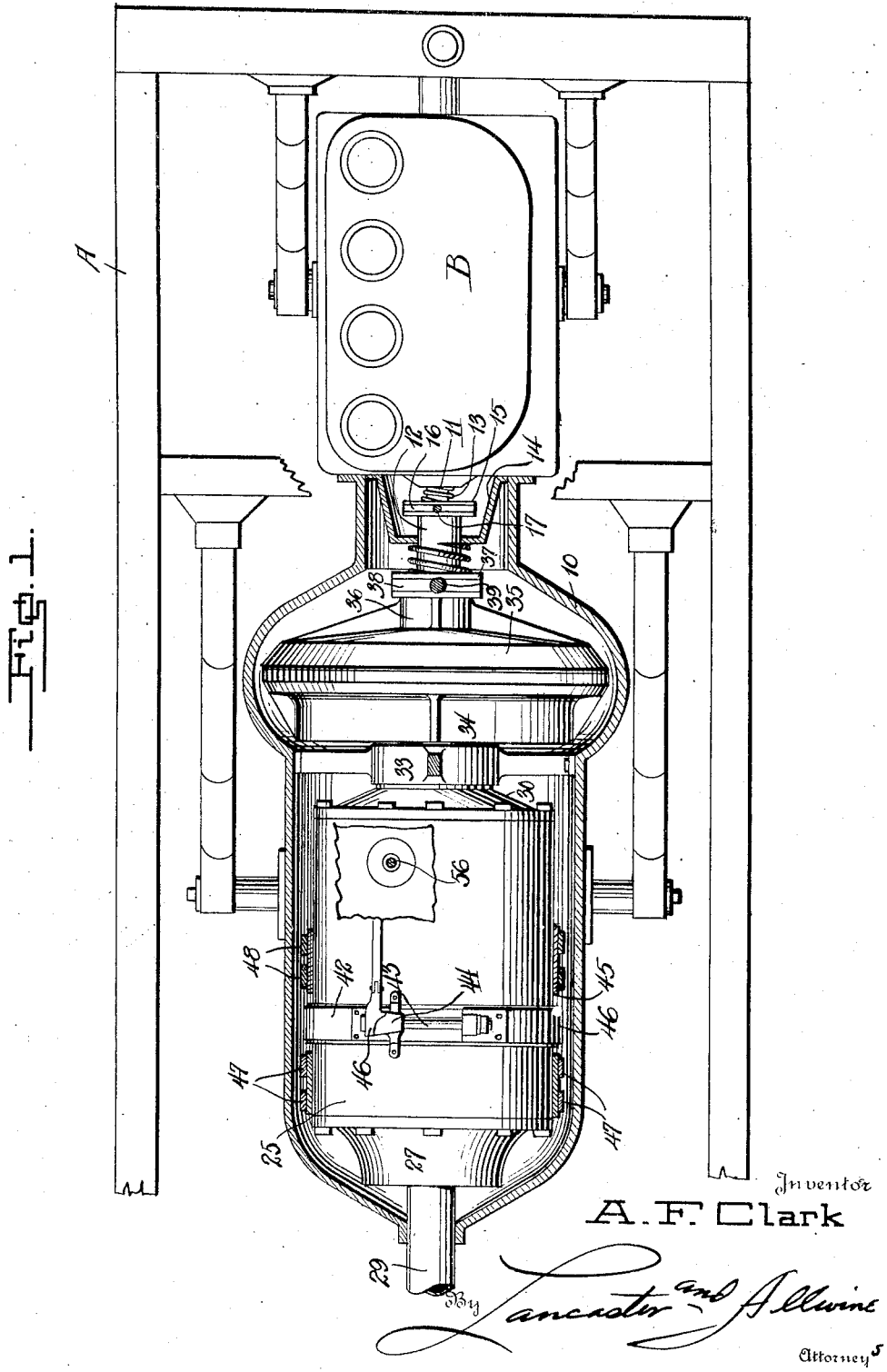

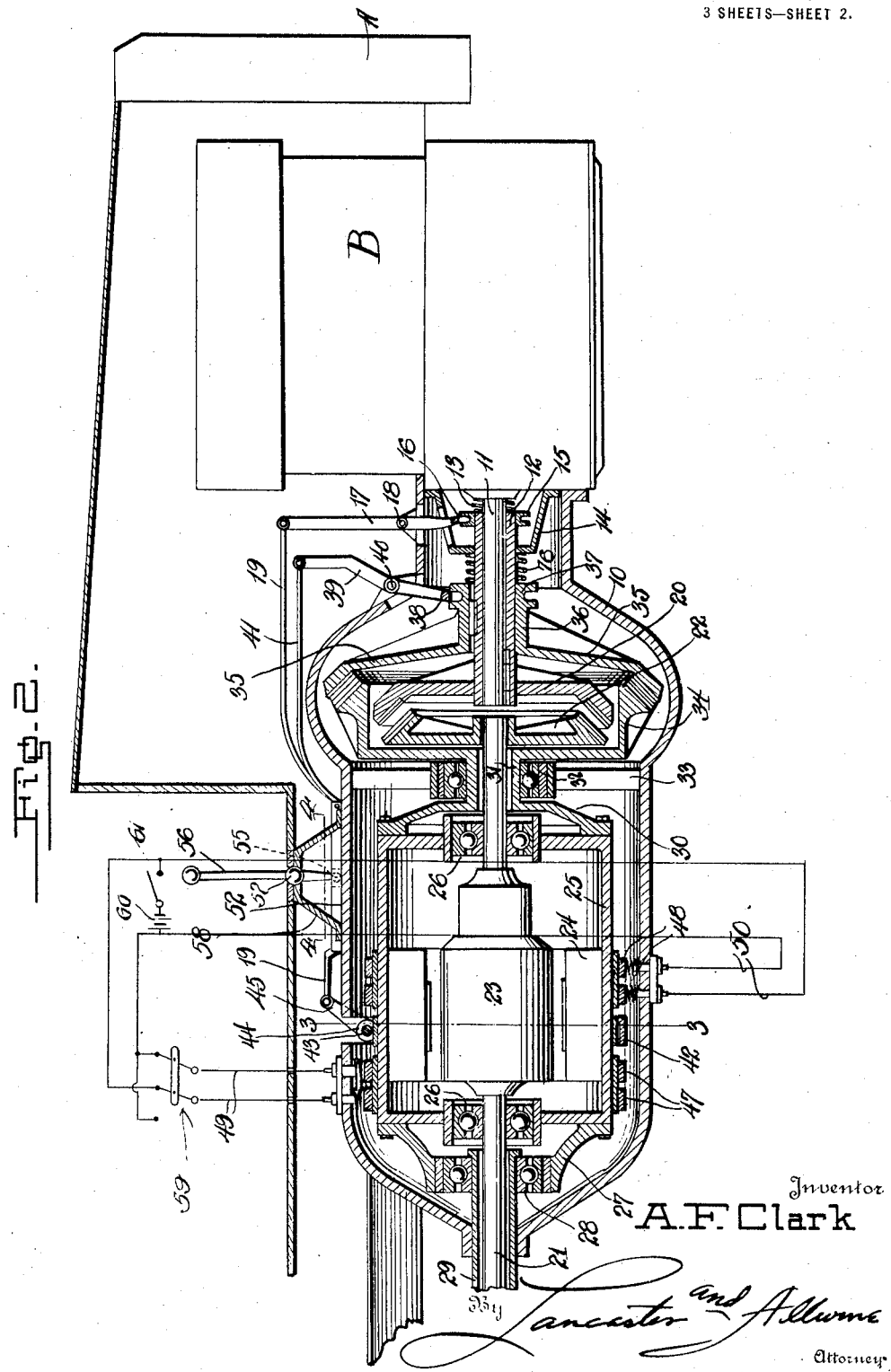

UNITED STATES PATENT OFFICE.

ABSOLAM F. CLARK, OF LOS ANGELES, CALIFORNIA.

ELECTROMECHANICAL PROPELLING AND TRANSMITTING MECHANISM.

1,347,250.  Specification of Letters Patent.  Patented July 20, 1920.

Application filed March 27, 1917. Serial No. 157,699.

*To all whom it may concern:*

Be it known that I, ABSOLAM F. CLARK, a citizen of the United States, and a resident of Los Angeles, in the county of Los Angeles and State of California, have invented a certain new and useful Improvement in an Electromechanical Propelling and Transmitting Mechanism, of which the following is a specification.

The present invention relates to a mechanism for propelling, and for transmitting power derived from electrical and mechanical sources, and has for an object to provide a unitary plant adapted particularly for motor vehicles to drive the same electrically, or to drive the same by means of the ordinary internal combustion engine through a combined electrical and mechanical transmission device.

Another object of the present invention is to provide a mechanism of this character embodying a motor generator which may be used for propelling the vehicle and starting the engine, and which subsequently may be employed for charging a storage battery or the like by the internal combustion engine after the same has been started.

The invention further aims at the provision of a motor generator provided with an armature and a field member which are rotatable independently of each other, and to provide means for controlling the rotation of the field member to vary the torque between the same and the armature for propelling the vehicle, and also for starting the internal combustion engine.

The above, and various other objects and advantages of this invention will be in part described, and in part understood, from the following detailed description of the present preferred embodiment, the same being disclosed in the accompanying drawings wherein:

Figure 1 is a top plan view, partly in section, of an electro-mechanical propelling and transmitting mechanism constructed according to the present invention and being applied to the frame of a motor vehicle.

Fig. 2 is a longitudinal vertical section through the same, parts being shown in elevation.

Fig. 3 is a transverse section taken through the motor generator on the line 3—3 of Fig. 2, parts of the mechanism being omitted for the sake of clearness, the view illustrating the application of the brake band to the field member or shell of the motor.

Fig. 4 is a horizontal section on the line 4—4 of Fig. 2, showing the hand lever connection with the clutch and brake mechanisms.

Referring to these drawings, A designates the frame of a motor vehicle provided with an internal combustion engine B of any approved type, and which is mounted in the same in any suitable manner.

Projecting rearwardly from the engine B, is a housing or casing 10 which is suitably formed to inclose the mechanism of this invention. The crank shaft of the engine B is provided with an extension 11 upon which is keyed a sleeve or tube 12 adapted to move longitudinally upon the shaft extension 11, and which is urged rearwardly away from the engine B by means of a spring 13 interposed between the crank case of the engine and the adjacent end of the tube 12. A bearing bracket 14 is carried upon the engine B and surrounds the tube 12 to support the same. The forward end of the tube 12 is provided with a peripherally grooved collar 15 in which a yoke 16 engages, the yoke being carried upon the lower end of a lever 17 suitably pivoted intermediate its extremities upon a pin 18 carried upon the upper wall of the housing 10. The lever 18 projects upwardly through the housing 10 and is pivotally connected at its upper end to a connecting rod 19.

The tube 12 is provided upon its rear end with a clutch member 20 fixed to the tube and adapted to be shifted therewith. A drive shaft 21 extends longitudinally through the casing 10 and terminates at its forward end in spaced relation to the crank shaft extension 11. The drive shaft 21 is provided upon its forward end with a clutch member 22 adapted for engagement with the clutch member 20 when the latter is shifted rearwardly by the movement of the sleeve 12. The clutch members 20 and 22 are adapted to interlock the drive shaft 21 with the crank shaft extension 11 to propel the vehicle directly from the internal combustion engine B.

The drive shaft 21 is provided intermediate its ends, and within the rear end of the housing 10, with an armature 23 adapted to turn with the drive shaft 21, and about which is arranged a field member 24 suitably mounted within a drum or casing 25 which has bearing at opposite ends, as at 26, directly upon the drive shaft 21. The drum 25 with its field member 24 is adapted to turn about the armature 23 independently of the rotation of the latter. The casing 25 is provided upon its rear end with a cap 27 inclosing the adjacent bearing 26, and which is mounted upon a bearing 28 supported upon a housing 29 which surrounds the drive shaft 21 and projects into the rear end of the casing 10. The cap 27 is adapted to support the rear end of the casing, and the latter is adapted to support the bearing 26 which carries the drive shaft 21 therethrough.

The casing 25 is provided upon its forward end with a cap 30 which is formed or carried upon the rear end of a hub 31 which surrounds, but is preferably not in contact with the drive shaft 21. The hub 31 projects through a bearing 32 which is supported in a bracket 33 projecting from the inner wall of the casing 10. The forward end of the hub 31 is provided with a clutch member 34 which is hollow, is relatively large, and which incloses the clutch members 20 and 22. A second relatively large clutch member 35 is adapted to interfit with the clutch member 34 and is provided with a hub portion 36 keyed upon the sleeve 12 for rotation therewith, and adapted to move longitudinally thereon. The forward end of the hub 36 is provided with a peripherally grooved collar or flange 37 adapted to receive the ends of a yoke 38 therein, the latter being carried upon the lower end of a shifting lever 39. The lever 39 is pivoted upon a pin 40 which engages the lever intermediate its ends and which is mounted upon the upper side of the casing 10. The upper end of the lever 39 is pivotally connected to a connecting rod 41 by means of which the lever 39 and its clutch member 35 may be shifted. The field drum 25 is controlled in its turning movement by means of a brake band 42 which surrounds the intermediate portion of the drum 25, and which is connected at one end to a draw bolt 43, which is secured at its opposite end upon a fixed lug 44 carried by the casing 10. The draw bolt 43 passes freely through the lug 44 and carries upon its projecting end an operating lever 45, the latter working against the cam face 46 of the lug 44. The cam 46 is so formed that when the lever 45 is swung forwardly, as shown in Figs. 1 and 2 of the drawings, the brake band 42 binds upon the drum 25, and the latter with its field member 24 is held from turning about the armature 23. The drum 25 is provided exteriorly with one or more pairs of contact rings 47 and 48 adapted to be connected to wires 49 and 50 which lead respectively from an exciter or the like for energizing the motor, and to a storage battery or the like when the mechanism is used for generating a current. The armature 23 and the field member 24 are only diagrammatically disclosed in the drawings, and it is to be understood that the same and the parts thereof are to be of any approved construction to carry out the features of this invention.

The brake arm 45 is connected to the rear end of the connecting rod 19, and the rod 19 has pivotal connection at a suitable point intermediate its ends with a sliding block 51 mounted upon the upper side of the casing 10. The connecting rod 41 has pivotal connection at its rear end to a second block 52 which is slidably mounted upon the upper side of the casing 10. The blocks 51 and 52 are arranged in closely spaced-apart relation, and are provided intermediate their ends with a pair of registering recesses or notches 53 and 54 adapted to receive therein, one at a time, the head 55 formed upon the lower end of a hand-lever 56, the latter being provided with a supporting ball 57 intermediate its ends universally mounted in the upper end of a conical support 58. The support 58 is preferably in the form of a casting adapted for securement to the upper face of the casing 10, and which is provided with ways therethrough for the reception of the opposite ends of the sliding blocks 51 and 52. The lower end of the lever 56 projects downwardly from the ball 57 into a position intermediate the notches 53 and 54, and the head 55 of the lever is adapted for engagement in the opposed notches one at a time by the lateral swinging of the lever 56.

In the diagrammatic showing in Fig. 2, the wires 49 lead to the blades of a pole changer 59. The other contacts lead to a battery 60. By means of this circuit the polarity of conductors 49 may be changed. A cut out switch 61 is in circuit with the battery, and conductors 60 lead to the battery terminals.

The operation of the device above described is as follows:

When the vehicle is at rest, and it is desired to start the same, a circuit is closed through the wires 49 to energize the dynamo-electric machine. If the drive shaft 21 is to be propelled electrically, the brake band 42 is first released so that when the current is closed through the dynamo-electric machine the field member 24 and the drum 25 are rotated. The brake band 42 is now gradually drawn taut about the drum 25 to slacken the speed thereof, and the torque of the motor then causes the armature 23 and the drive shaft 21 to rotate. The brake band 42, and its draw bolt 43, are so proportioned that the brake band binds upon the drum 25 prior to the interlocking of the clutch members 20 and 22. It is of course evident that when the drum 25 is locked from turning, the dynamo-electric machine reaches its highest speed.

When it is desired to start the internal combustion engine B, the shaft 21, being held from turning by the weight of the vehicle and the usual rear wheel brakes, it is only necessary to close the circuit through the dynamo-electric machine and release the field drum 25, as above described. The hand lever 56 is now interlocked with the slide 52 and draws rearwardly to gradually move the clutch element 35 into engagement with the clutch element 34. The drum 25 is thus free to turn, and the crank shaft projection 11 is interlocked with the drum. The field member of the dynamo-electric machine now turns the crank shaft projection 11 and starts the motor B. As soon as the motor B is running under its own power, it revolves the drum 25 at a relatively high rate of speed, and the field member 24 thus rotated causes the armature 23 and the drive shaft 21 to turn and gradually increase in speed to approach that of the field member. As soon as the drive shaft 21 has reached a desired speed, the lever 56 may be shifted into an opposite position to release the clutch members 34 and 35, and bind the brake band 42 upon the drum 25 for holding the latter from turning, and at the same time to interlock the clutch members 20 and 22. The engine is now directly connected to the drive shaft 21, and the electrical unit may be used as a generator.

I claim:—

1. In a power unit, the combination with a gas engine, and a driven shaft, of a dynamo-electric machine having rotatable sections one of which is connected to the driven shaft, clutching means between the gas engine and the driven shaft, a second clutching means between the gas engine and the other section of the dynamo-electric machine, and means for controlling the rotation of said other section of the dynamo-electric machine and adapted to maintain the same stationary when said second clutching means is inoperative.

2. In a power unit, and in combination, a dynamo-electric machine having independently rotatable sections, a driven shaft connected to one of said sections, a gas engine, a clutch between the gas engine and the driven shaft, a second clutch between the gas engine and the other dynamo-electric machine section, means for controlling the rotation of said other section, and a connection between said last-named means and said first clutch to hold the said other section of the dynamo-electric machine stationary when said first clutch is engaged.

3. In a power unit, the combination with an internal combustion engine and a drive shaft, of an armature carried by said drive shaft, a field member rotatably mounted about the armature, a clutch member on the drive shaft, a second clutch member on the field member, a brake for application to the field member, and complemental clutch members on the shaft of the engine adapted to be interlocked one at a time with the clutch members upon the drive shaft and the field member.

4. In a power unit, the combination with an internal combustion engine and a drive shaft, of an armature carried by the drive shaft, a field member rotatably mounted about the armature, a pair of clutch members independently shiftable upon the crank shaft of the engine, clutch members on the drive shaft and the field member, a brake for application to the field member to control the turning of the same, and a connection between the clutch members of the crank shaft and the drive shaft and said brake member for simultaneously interlocking the drive shaft and the armature to the crank shaft and arresting the rotation of the field member.

5. In a power unit, the combination with an internal combustion engine and a drive shaft, of an armature mounted on the drive shaft, a field member rotatably mounted about the armature, clutch members on the drive shaft and on the field member, a pair of independently shiftable clutch members mounted on the crank shaft of the engine, means for operating said clutch members for interlocking engagement one at a time with the clutch members of the drive shaft and the field member, and a brake connected to the field member for controlling the operation thereof and having connection with the clutch member of the crank shaft adapted for interlocking engagement with the drive shaft.

6. In a power unit, the combination with an internal combustion engine and a drive shaft, of an armature mounted on the drive shaft, a field member rotatable about the armature, a brake-controlling the turning of the field member, means for interlocking the field member with the engine to turn the field member and electrically rotate the drive shaft, and means for directly connecting the drive shaft to the engine and associated with said brake to restrain the field member from rotation when the drive shaft is driven directly from the engine.

7. In a power unit, the combination with an internal combustion engine, of a casing arranged adjacent thereto, a drive shaft mounted in the casing, a clutch member on the end of the drive shaft, a complemental clutch member carried by the engine, means for interlocking said clutch members to directly rotate the drive shaft by the engine, an armature on the drive shaft, a field member mounted for rotation in the casing about the armature, a clutch member on said field member, a complemental clutch member on the shaft of the engine, means for interlocking said second clutch members for connecting the engine to the field member, means for closing a circuit through the field member and armature for driving the field member when the armature is stationary to start the engine, and means for insuring the release of one set of clutch members when the other set is engaged to drive the armature within the field member when the latter is released from the engine.

8. In a power unit, the combination with a driven shaft, and an internal combustion engine, of a dynamo-electric machine having relatively movable parts one of which is connected to the driven shaft and normally held stationary thereby, means for closing a circuit through the machine for actuating the same to turn the other part, means for coupling the engine to the machine for starting the engine, the engine when running being adapted to turn said other part of the dynamo-electric machine and magnetically turn the first part thereof with the shaft when released, means for connecting the drive shaft directly to the engine when the coupling means is released to drive the shaft directly by the engine, and means for holding said other part of the dynamo-electric machine from turning when released from the engine for operating the dynamo-electric machine as a generator.

ABSOLAM F. CLARK.